Feb. 3, 1948. W. KUBACKI ET AL 2,435,449
FOAM FORMING APPARATUS
Filed Dec. 6, 1944 3 Sheets-Sheet 1

INVENTOR.
Radcliffe Morris Urquhart
Wallace Kubacki
Strauch & Hoffman
Attorneys

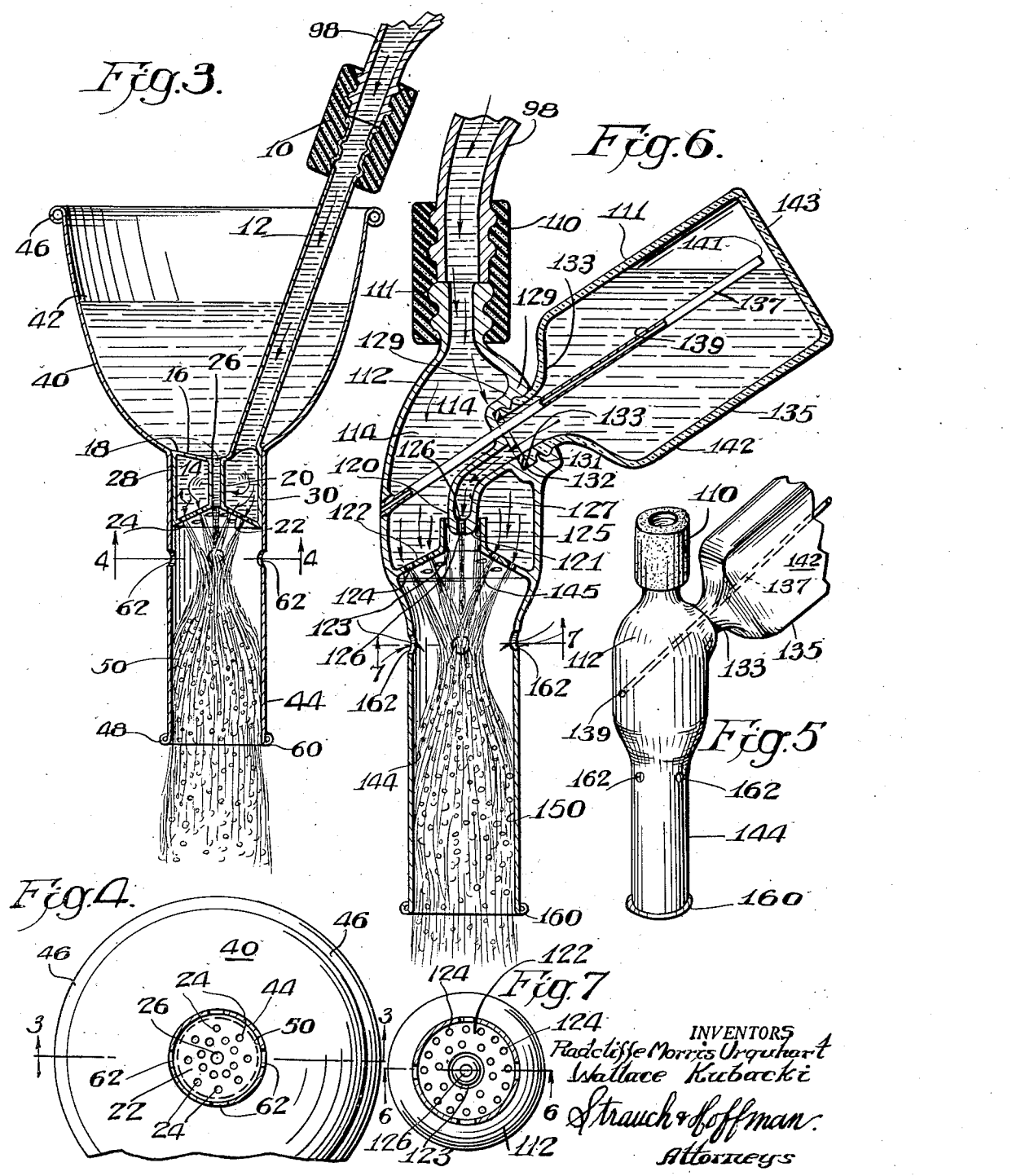

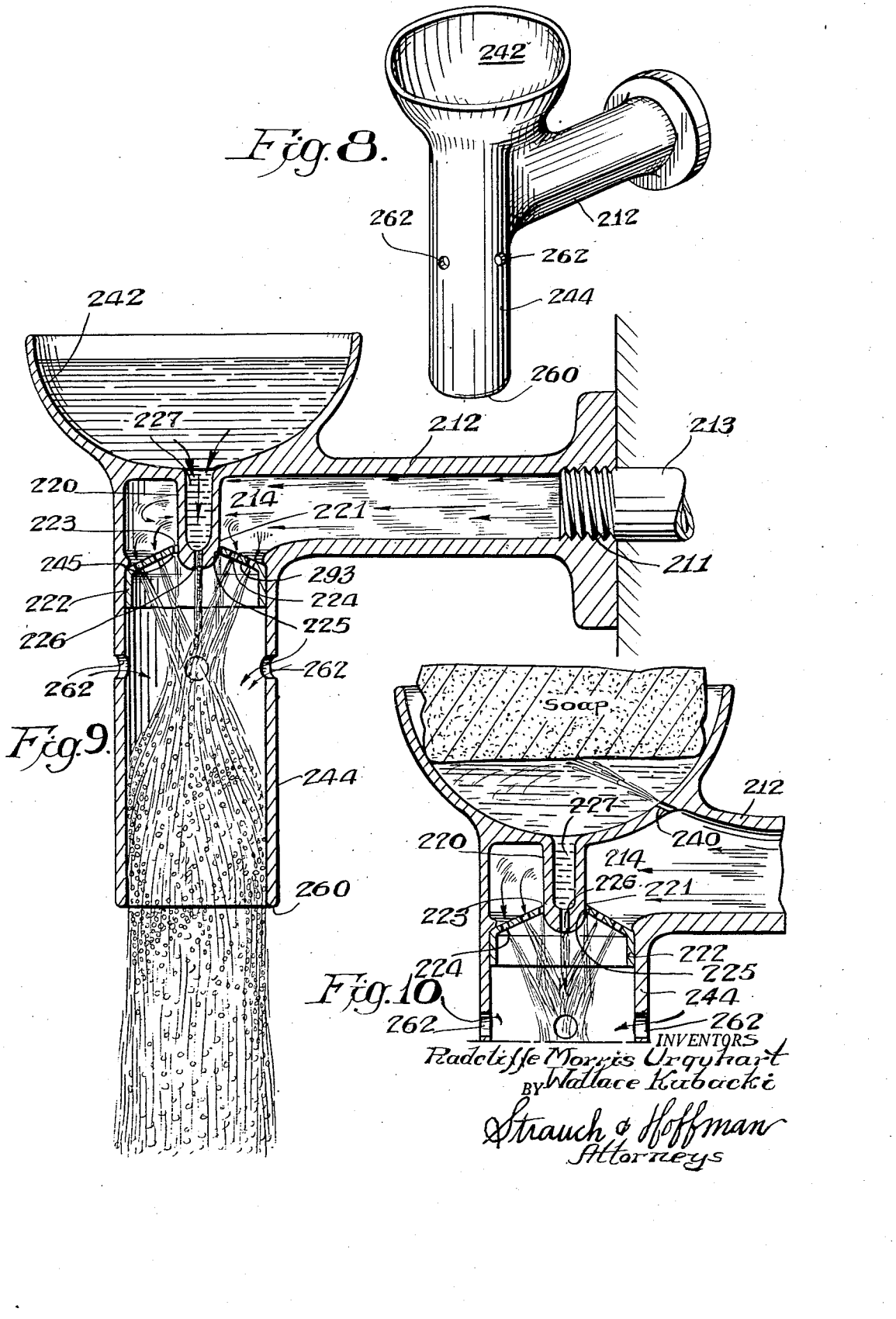

Patented Feb. 3, 1948

2,435,449

UNITED STATES PATENT OFFICE 2,435,449

FOAM FORMING APPARATUS

Wallace Kubacki, Reading, and Radcliffe Morris Urquhart, Wayne, Pa.; said Kubacki assignor to said Urquhart Application December 6, 1944, Serial No. 566,918

2 Claims. (Cl. 261—76)

This invention concerns apparatus for making light-bodied cellular masses for use in foam bathing, the laundering of sheer textiles, the control of insects by retarded drying of insecticide sprays, and varied other uses.

Foams and froths have been made by enveloping gas in a liquid by chemical reaction or by entraining the gas through mechanical disturbance of the liquid. Among the means utilized for mechanical entrainment are beating as with an egg beater or other mechanical beating means, agitating as with a flow of compressed gas, charging as with dissolved gases liberated upon a reduction of pressure or increase of temperature or by shock, and variations thereof such as boiling to produce a compressed vapor which subsequently agitates the boiling liquid.

Each of the aforementioned modes of producing mechanical foam has inherent limitations as to the quantity or quality of foam that can be made from a given amount of foamaceous liquid. Thus, mechanical beating generally is not conducive to generating large quantities of foam, for thin walled bubbles are broken down unless they can be transported quickly from the beating zone. On the other hand, boiling generally gives large bubbles, but these readily disintegrate. Further, both these methods are relatively costly in the work required for foam production and in the nature and maintenance of the equipment required. Obviously, charging requires costly pressure vessels whose liquid and dissolved gas content is limited, thereby precluding continuous foam production. Therefore, the deliberate production of mechanical foam today largely is restricted to use of a hydraulic stream subjected to impingement or other forms of dispersion or to use of a high pressure gaseous stream sufficient to agitate or disperse the foamaceous liquid for the production of large volumes of foam in continuous fashion.

One of the principal uses of foam produced in the last mentioned way is for the extinguishing of fires. Such foam generally is formed by dispersing a hydraulic stream and has a heavy body composed of uniformly distributed fine-grained bubbles. The foamaceous liquid employed consists usually of about ninety parts of water and ten parts of a suitable stabilizer which retards the disintegration of the bubbles. When diluted down to but 2-3 parts stabilizer, the foam produced generally is too "watery" to be of any value, being a scummy mass of irregularly-sized bubbles in meager quantity. However, neither the ten part nor the 2-3 part stabilizer foamaceous liquids yield light-bodied foams as usually are desired for foam bathing when produced in any of the foam generating devices hitherto known. Further, the cost of the stabilizer would preclude the use of any such ratios for foam bathing except as the extreme of novelty.

Disregarding the almost non-existent use of known apparatus especially developed for producing foam baths, the average person of today is limited to generating foam by pouring a small quantity of soapy powder or liquid or some foam producing "oil" preparation in a bath tub and beating the same with a forceful stream of water from the spigot. Notwithstanding all the patents concerning foam production and even the large number thereof specifically concerned with foam bathing, the above described and exceedingly crude method is principally used.

It is because of the limited quantity of foam obtained, its highly perishable nature, the messiness involved with the use of the aforedescribed crude method, and defects of other suggested schemes that foam baths have not enjoyed a wider popularity. Among the reasons for the unsatisfactory nature of such prior foam baths are that the powdered soap preparations do not dissolve instantaneously; often are driven back by the water discharge to the rear of the tub and form a flaky cake; and are not suitable for use with hard water or sea water. The liquid soap preparations likewise yield limited quantities of foam in hard or sea water, and this foam tends to disintegrate very rapidly. However, their better ability to dissolve readily in ordinary water results in a more and more diluted foamaceous liquid as the tub fills and rapid dilution to such low concentration of stabilizer that only very large and readily perishable bubbles are formed.

It is, accordingly, the primary object of this invention to provide an apparatus able to produce light bodied foams in simple and inexpensive fashion never before effected. We do this by an apparatus which combines the action of drawing an ordinary bath with the resulting beating action and the efficiency of foam production of hydraulic stream dispersing nozzles to produce copious volumes of exceedingly better quality, long lasting, and more suitable foam for "foam" or "bubble" baths at low cost.

It is another major object of this invention to provide a simple and inexpensive foam producing nozzle utilizing ratios of stabilizer to liquid in proportions of 1 part to 200 or more which will yield relatively stable light-bodied foams in tremendous quantities capable of filling an ordinary bath tub to overflowing with less than four ounces of stabilizer solution in but approximately the time required to draw water for an ordinary bath.

It is another major object of this invention to provide a nozzle which will aerate the water discharged therethrough to purify and somewhat soften the same and further be capable of use as a proportioner for intimately mixing various liquids or solids with the water in predetermined ratios to thus increase its versatility and scope of usefulness.

It is another object of this invention to provide a foam producing nozzle with means for attaching a charge of stabilizer thereto and designed to control the flow of said stabilizer therefrom to form a concentrated foamaceous liquid and subsequently disperse by impinging jets of water, to dilute it and form a foam stream which is impinged on a liquid or liquid-covered surface to beat the liquid and foam for the production of additional quantities of light-bodied foam.

It is a further object to supply said stabilizer so it can be fortified with insecticides or degreasing or other agents to effect a foamaceous discharge for the special treatment of bodies exposed thereto regardless of the contour of the same.

It is another object of this invention to have a simple and inexpensive foam producing nozzle whose operation is foolproof and which can be attached to water sources having a wide range of pressures, as from fifteen to twenty pounds per square inch minimum to over one hundred pounds per square inch maximum, and yet yield reasonably similar quantities and qualities of foam.

It is another object of this invention to provide a foam producer capable of altering the character or body of foam formed within considerable limits by employing more concentrated or more dilute stabilizer solution and without the necessity for any mechanical adjustments of the foam producing nozzle.

It is another object of this invention to provide a foam producer of such compactness that it can be incorporated in an ordinary bath tub spigot to serve as an aerating device, proportioner, and foam nozzle and yet be equally efficient for each task without the necessity for making any mechanical alterations thereof.

These and other useful objects will become apparent by referring to the accompanying specification, including the several figures of the drawings, wherein:

Figure 3 is a cross-sectional view of the foam nozzle of Figures 1 and 2, being taken along line 3—3 of Figure 4;

Figure 4 is a partial sectional view of the foam nozzle at line 4—4 of Figure 3, looking in the direction of the arrows toward the top of the foam nozzle;

Figure 5 is a partial perspective view of another embodiment of the invention;

Figure 6 is a cross-sectional view of the foam nozzle of Figure 5 and taken along line 6—6 of Figure 7;

Figure 7 is a partial sectional view of the foam nozzle of Figures 5 and 6, and taken looking toward the top of the foam nozzle from the line 7—7 of Figure 6;

Figure 8 is a perspective view of a third embodiment of the invention;

Figure 1:
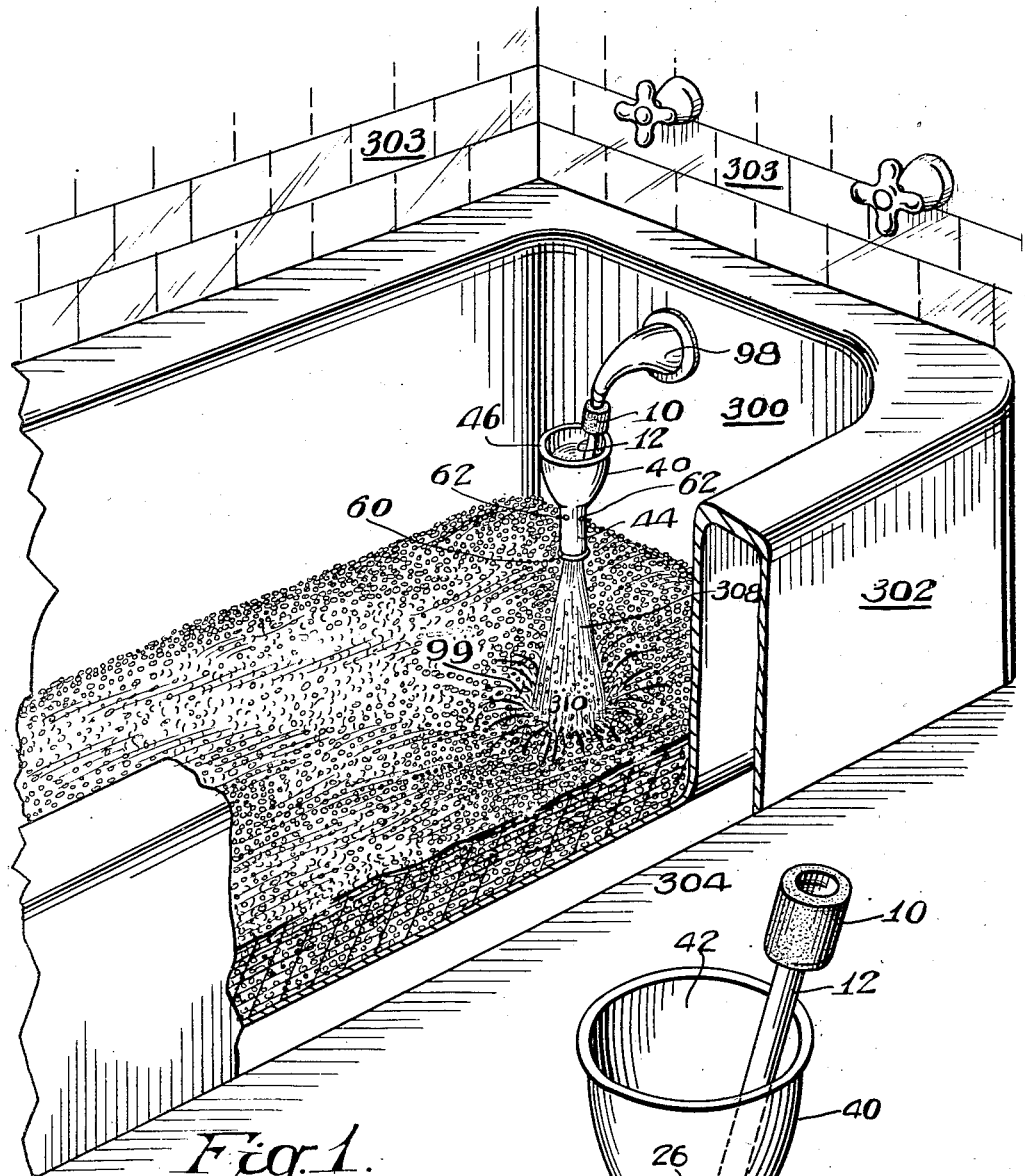
Figure 1 is a perspective view showing one embodiment of the invention applied to a typical bath tub, the tub being cut away so as to depict the formation of foam therein.
Figure 2:
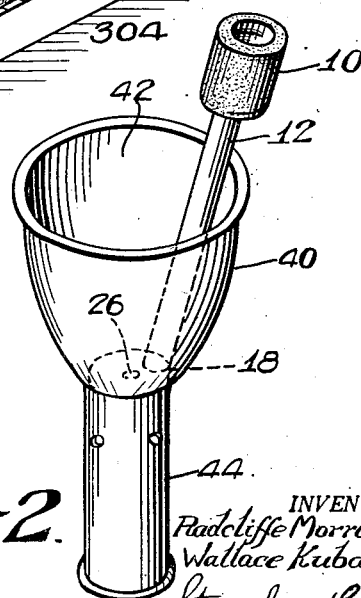
Figure 2 is a perspective view of the foam nozzle of Figure 1 showing constructional details on a larger scale.

Figue 9 is a cross-sectional view of the foam nozzle of Figure 8; and

Figure 10 is a partial cross-sectional view of the foam nozzle of Figures 8 and 9 as slightly modified to be useful in dissolving foamaceous or other matter stored in the nozzle and eventually discharged for the production of foam or preparation of blended and proportioned liquids.

Referring to Figures 1 through 4, there is shown one embodiment of the invention, namely, a nozzle for attachment to bath spigots and the like. This nozzle includes an adapter 10 of suitable internal configuration to be attached to spigot 98 (which may be of any conventional type) and grasp the same against moderate forces which may tend to separate these members. While a frictional-grip rubber adapter is depicted, any other suitable type may be employed. Adapter 10 also coacts with tube 12 to connect the tube in leak-proof and depending relationship to spigot 98. Tube 12 is depicted as being integral with jet chamber 14 which approximates two concentric thin-walled cylinders aligned by and integral with upper and lower thin-walled truncated cones 16 and 22. Upper truncated cone 16 is pierced only by tube 12 and permits complete drainage of any fluid resting on surface 18 into inner cylinder 20. Lower truncated cone 22 surrounds inner cylinder 20 and is pierced by a plurality of jet holes 24 arranged in any suitable pattern about the bore 26 of inner cylinder 20. Outer cylinder 28 surrounds cones 16 and 22 to seal jet chamber 14 with access thereto only through tube 12 and jet holes 24. Thus, fluid supplied to chamber 14 through tube 12 is confined to emerge therefrom only through jet holes 24.

Combined storage cup and draft tube 40 is designed to be fabricated from thin metal stock so as to have flared cup portion 42 preferably slope toward cylindrical draft tube portion 44 to assure drainage theretoward. Edge 46 of cup portion 42 and edge 48 of draft tube portion 44 may be beaded or otherwise dulled to avoid possible injury in handling the same. Combined member 40 is fabricated so as to have bore 50 of tube portion 44 slip snugly around surface 30 of jet chamber 14. Thus, member 40 may be aligned with and rigidly connected to jet chamber 14 for support by tube 12 and adapter 10 by crimping or by welding to assure a leak proof connection between portions 42 and 44 of member 40 and jet chamber 14.

The operation of the device is as follows, it being understood that no limitation is intended other than to the basic principles involved. Adapter 10 is pushed on or fastened to spigot 98, and fluid is permitted to flow to jet chamber 14 through tube 12. This fluid emerges from chamber 14 through jet holes 24 whose combined discharge converges (as is shown in Figure 1) and by such occasioned impingement produces a high degree of turbulence and dispersion of said discharge which is confined by inner surface or bore 50 of tube portion 44 of member 40 to emerge forcefully from the device.

In this condition, the device is remarkably useful for the aeration of the fluid supplied thereto by virtue of bore 26, air ports 62 and the high degree of dispersion to which the fluid is subjected even at relatively low fluid entry energies. Even at included angles of one hundred degrees or less of lower cone 22, the frictional loss is not excessive despite the concentrated impingement effected thereby. As the included angle of the cone is increased beyond 100 degrees, the velocity of the discharged streams generally can be augmented by decreasing the size of jet holes 24 to compensate for the reduction of impingement effect through increased turbulence of flow from the jet holes, especially when low length diameter jet hole proportions are employed. Thus, the degree of dispersion can be controlled throughout wide ranges of included angle of cone 22, and we do not limit ourselves to use of any particular included angle, though those approximating one hundred eighty degrees or more are not as satisfactory as ones specifically chosen to have impingement of the streams from jet holes 24 occur within the length of tube 44 of member 40. It further is preferable to have the length of tube 44 of member 40 sufficient to confine the dispersed discharge therefrom to avoid extreme splashing thereof.

It should be obvious that the device can be used as a proportioning means for controlling the rate of flow of different substances supplied to jet chamber 14 and cup 42. Thus, softeners, medicants, etc., can be supplied to cup 42 for intimate mixing with, say, water flowing from jet holes 24 of chamber 14. However, it is especially effective for the production of foams by virtue of the intimate mixing of foamaceous material flowing from cup 42 through bore 26 of chamber 14 with the liquid discharged from jet holes 24 thereof and gaseous entrainment occasioned not only by the aspirating action of the highly dispersed stream drawing air through holes 62 but also by the liberation of dissolved gases for envelopment and enormous gaseous envelopment occasioned by the beating of the forcefully discharged stream from tube 44 upon a wetted or liquid surface to which said stream is directed and as is shown in Figure 1 where the discharge from tube 44 is directed on and beats liquid plane 99.

The crux of the invention, as to its light-bodied foam production, is that it has been found that such foams can be produced in copious volume from as little as one part foamaceous matter to several hundred parts of non-foamaceous liquid when such matter is mixed intimately with the non-foamaceous liquid and the diluted foamaceous liquid formed by said mixing is dispersed to aerate the same and subsequently forcefully directed against a shock plane to liberate the dissolved gases therein for envelopment and to create a wetted surface or liquid plane which is violently beaten to envelop large additional quantities of gas and which serves to transport the foam produced away from the beating zone to preserve the same from mechanical disintegration. To this end, the device just described and shown in Figures 1 through 4 serves admirably even though it is extremely simple and inexpensive to manufacture. Further, the very simplicity thereof permits its being made compactly to have great strength (though of light weight) and assures foolproof operation by even the most inexperienced users. All that is required is that it be attached to a spigot and that it be supplied with water therefrom and that foamaceous matter be poured into cup 42. Light-bodied foam will be formed when the discharge from tube 44 is properly directed onto a liquid surface or a liquid covered surface. The only requisite is that bore 26 be free to permit flow of foamaceous matter from cup 42. Except for deliberate sealing of jet holes 24, water pressure in jet chamber 14 will assure their being kept open. Should, however, bore 26 be clogged by foreign matter dropped into cup 42, it is a simple matter to use a pipe cleaner or other probe to clean the same inasmuch as it is most readily accessible.

Whether end 60 of tube 44 is exposed to the atmosphere or immersed in liquid is of relatively little moment, though finer grained foam is formed when immersion is effected. This follows since air is available for aerating the dispersed foamaceous liquid by either method as well as a wetted or liquid shock plane. We attribute the finer grain of foam produced by immersion of end 60 of tube 44 to the fact that very large bubbles undergo mechanical subdivision in being forced into and through the liquid seal. Naturally, finer grain of foam is effected only by some reduction in total foam volume, but such foam has somewhat better lasting qualities because it dies more slowly. Either way, a suitably proportioned foamaceous liquid is continually producing foam in a localized zone for transport away therefrom. This eliminates the inefficiency of pouring concentrated foamaceous matter under an ordinary spigot only to have the majority thereof quickly be driven away from the beating zone under said spigot by the discharge therefrom. When, as is presently most commonly done, this latter method is followed, the meager amount of foam obtained is most irregular in texture; for that initially formed is scummy, due to the excess concentration of foamaceous matter, and the rapid dilution of the foamaceous charge so that only a small portion thereof ever has undergone even any crude blending and beating action is highly wasteful of the inherent foam forming properties thereof. Further, the extreme dilution experienced by whatever foamaceous matter circulates back under the water discharge from the spigot precludes production of any but the thinest walled bubbles of such large size that they dry within a very brief time and disintegrate almost immediately upon mechanical contact with the bather or any surface relative to which they experience a moderate impact.

Attention is drawn to the fact that the discharge of foamaceous matter from cup 42 through bore 26 of jet chamber 14 is progressively less as this matter is consumed because the pressure or head effecting flow from cup 42 through bore 26 of jet chamber 14 depends upon the level of the foamaceous matter within cup 42. This is especially advantageous when the device is to be used to produce foam on a liquid plane which initially has been established with a considerable depth of ordinary water; for use of the device progressively strengthens the foamaceous concentration thereof; consequently, it is possible to have the foamaceous material in cup 42 discharge only at such a rate as will augment the foamaceous content of the liquid in the beating zone to approximate some predetermined strength. Even when the device is used to establish its own liquid plane, this characteristic is of considerable value; for the initially formed foam suffers less mechanical disintegration in wetting the carrier therefor, such as a tub bottom when more highly fortified with foamaceous matter; also, the overall beating time is slightly extended to partially compensate for the fact that no nozzle is capable of utilizing all the inherent foam producing properties of any foamaceous matter in one brief beating phase. However, to the last bit of foamaceous matter consumed, the concentration of foamaceous liquid in the beating zone still is sufficiently large to avoid the extremely thin walled and very perishable bubbles obtained when ordinary water is sprayed on the highly diluted foamaceous liquid as in preparing the aforementioned common type of "bubble bath."

Among the refinements of the embodiment shown in Figures 1 through 4 is the fact that the tube 12 is inclined so as to have the normal axis of bore 26 substantially vertical when the device is attached to the usual outwardly directed bath tub spigot. Also, cup 42 and upper surface 18 of cone 16 are so deposed as to assure reasonably complete drainage of foamaceous matter to bore 26 of jet chamber 14. Further, by beading edge 48 of tube 44 to have the end 60 as depicted with the bead diameter larger than bore 50 of tube 44, no interference to the dispersed stream flowing through bore 50 is occasioned. It should, however, be realized that the device can be made of several separate parts suitably joined to achieve the same relationship and results. Likewise, the invention is not limited to any particular materials for construction of the same, it being well understood that plastics, glass, light metal, and other substances can be employed as desired. Nor is the invention limited to the particular dimensions depicted, certain of which are exaggerated and others of which are reduced for purposes of illustration.

Referring to Figures 5 through 7, there is depicted another embodiment of our invention; namely, a nozzle designed for attachment to bath spigots and the like but also capable of portable use as a spray gun for the application of foamaceous sprays or other sprays, including ordinary water, any of which can be fortified with such substances as medicants, insecticides, degreasers, or various other substances which can be carried by a fluid.

This nozzle is shown including a rubber adaptor 110 which may be connected to some source of fluid under suitable pressure as spigot 98. Adaptor 110 has a tight frictional grip around corrugations 111 of shell 112 to connect the shell with the adaptor in leak-proof and non-slip fashion. Shell 112 approximates a bell-like jet chamber 114 integral with a cylindrical draft tube 144 and separated therefrom by an integral cone 122 pierced by jet holes 124 to function as cone 22 and jet holes 24 of the embodiment of Figures 1 through 4 though a different pattern of jet holes is depicted merely to illustrate another arrangement.

Bent tube 120 is provided with bore 126 and made integral with shell 112 to extend therein with its lower end 121 a cylindrical portion concentric with but separated by an annular clearance 123 from the cylindrical shoulder 125 of cone portion 122 of shell 112. Thus, high pressure fluid flows not only through jet holes 124 but also as a tubular jet through clearance 123 to surround whatever fluid emerges from bore 126 of tube 120 and confine the same for eventual impingement by and complete dispersion with the fluid emerging from jet holes 124 and clearance 123. By this arrangement, it is assured that the fluid from bore 126 will be mixed intimately and subsequently dispersed, as has been described, regardless of the angle to which the shell 112 is moved from a vertical position, for the tubular jet from clearance 123 will pick-up any fluid from bore 126 of tube 122 that strikes this jet to dilute the same and transport it to the major impingement zone established by the converging jets from jet holes 124; that is, the flow of fluid from bore 126 of tube 120 must of necessity mix intimately with and be dispersed with the flow of fluid from jet chamber 114 in any position of the nozzle.

Bent tube 120 has duct 127 leading to bore 126 and draining from the lower portion of a bottle fitting 129 integral with shell 112 and having a configuration 131 adapted to coact with the screw top 133 of a bottle 142 which can be removed from and replaced into coacting relationship with shell 112 as desired. An annular washer 132 in bottle fitting 129 serves to seal bottle 142 and shell 112 in leak-proof relation, while the coaction of fitting 129 and screw top 133 of bottle 142 fastens bottle 142 and shell 112 together rigidly so that the outer surface 135 of bottle 142 may be used as a handle by one employing the nozzle.

It is obvious that a liquid will not flow from bottle 142 through duct 127 of tube 120 and bore 126 thereof unless something is able to replace the displaced liquid. For this purpose, we provide vent tube 137 integral with shell 112 and having bore 139 extending throughout its length to permit the flow of fluid outside shell 112 through bore 139 to emerge out end 141 of vent tube 137, end 141 being deposed near the bottom 143 of bottle 142 as depicted to facilitate the flow of a gas through bore 139 when liquid is used as the charge within bottle 142. Further, vent tube 137 should be provided with a bore 139 of suitable diameter to preclude the formation of a liquid seal therein by even relatively viscous liquids as may be used to charge bottle 142.

Inasmuch as the device is intended to be used with rounded end 160 of draft tube 144 exposed to the atmosphere and not immersed in any liquid seal, we prefer to provide holes 162 in tube 144 for the same purpose that holes 62 serve in the previously discussed embodiment. It should be noted at this time that the device is capable of mixing as many as four different fluids simultaneously by having one fluid flow from bottle 142, a second from jet chamber 114, a third from outside the device by employing holes 162, and a fourth to receive the combined discharge thereof from end 160 of the device. It further should be noted that the diameter of bore 150 of tube 144 and the size and number of holes 162 differ from that depicted in the embodiment of Figures 1 through 4, being dependent upon the capacity and physical construction of the device.

To further facilitate the operation of the device, when especially viscous liquids are placed in bottle 142, bore 126 of tube 120 may be subjected to an educting action by having it terminate within cylindrical shoulder 125 an appreciable distance above the junction 145 of shoulder 125 with cone portion 122 of shell 112. By proper proportioning of the aforementioned parts, it is possible to have fluid educed from bottle 142 as long as it can drain from bottle 142 to duct 127 of tube 120 for supplying bore 126 thereof as required. This is especially useful when the device is used to spray objects with irregular contours such as animals, plants, etc., because fluid from bottle 142 is available for discharge in all but a small portion of spherical sweep by the operator of the device. However, should it be desired to use the device for discharge from bottle 142 throughout only a lower hemisphere of sweep of draft tube 144, as for the purpose of conserving fluid within bottle 142 when spraying horizontal objects such as rugs, floors, etc., bore 126 of tube 120 may be positioned just upward of or beneath junction 145 so as to minimize the educing action thereon. By so doing, as also by eliminating annular clearance 123 entirely through a suitable insert or by making shoulder 125 integral with end 121 of tube 120 to approximate the construction of the previously described embodiment, flow of fluid from bore 126 of tube 120 will be responsive mainly to gravitational forces as previously explained.

The operation of this embodiment of the invention is so obviously similar to that of the previously described one as to require no further explanation, the important differences already having been discussed. For foam bathing, foamaceous matter can be used in bottle 142 and the spray from tube 144 directed on a small portion of the liquid plane in the tub or moved over the entire liquid plane by having adaptor 110 take the form of a hose (not shown) attached to spigot 98 and to corrugations 111 of shell 112. Should more than one full charge of foamaceous matter be desired, it is a simple matter to replace bottle 142 with another filled one. Likewise, vent tube bore 139 is as accessible as bore 26 of the embodiment of Figures 1 through 4 for cleaning to make both embodiments equally fool-proof in operation.

It should be obvious that a number of different substances can be supplied in succession to bores 26 or 126 as desired for discharge into the same receptacle. Thus, a nonfoamaceous medicant can thoroughly be mixed with other fluid to provide an initial liquid plane which subsequently may be beaten by a foamaceous discharge from the particular embodiment employed to have a medicated foam bath. Other variations are equally obvious.

Referring to Figures 8 through 10, there is depicted a third embodiment of the invention; namely, a nozzle in the form of a spigot like member for mounting above a coacting liquid plane as established in a common type of bath tub or the like.

In this embodiment pipe threads 211 are provided to attach spigot 212 (which may contain a suitable cutoff plug not shown) to an ordinary water pipe 213 for supplying pressure water to chamber 214. Cylindrical draft tube 244 is provided with jet cone 222 welded therein and having jet holes 224 which function as cone 22 and jet holes 24 of the embodiment depicted in Figures 1 through 4. Draft tube 244 is shown as being integral with spigot member 212.

Tube 244 has holes 262 and rounded end 260 for the same purposes as holes 162 and end 160 are provided in the embodiment of Figures 5 through 7.

The upper portion of member 212 is fashioned to form a cup like boss 242 which serves as cup 42 of the embodiment of Figures 1 through 4. Tube 220 is integral with spigot 212 and has duct 227 which leads to bore 226.

Lower cylindrical portion 221 of tube 220 is separated by an annular clearance 223 from the cylindrical edge 225 of cone portion 222 of tube 244. This functions as the similar parts of the embodiment depicted in Figures 5 through 7. It should be noted that bore 226 lies considerably below the junction 245 of cone edge 225 with lower surface 293 thereof. Thus, fluid in bore 226 will be subjected to practically no educing action but will flow by gravity from within boss 242 to the impingement zone created by the streams from clearance 223 and jet holes 224.

Although clearance 223 virtually can be eliminated by having edge 225 of cone 222 fit snugly around portion 221 of tube 220, it is preferable to utilize such a clearance to facilitate assembly of cone 222 in member 212 by eliminating a possible slight interference were cone 222 and tube 220 not perfectly axially aligned. For manufacturing reasons, it may be desirable to make tube 244 and tube 220 separate to be fastened to spigot member 212 in some suitable fashion though this arrangement is not shown, entailing only minor mechanical changes.

Since the term "fluid" as used in this specification is means to include not only gases and liquids but also such solids as have the pouring properties of a liquid; for example, granulated soap, suspended matter, crystalline matter, etc., and since it may be desired to facilitate the flow thereof by partially or completely dissolving the same or providing a fluid carrier therefor or possibly forming a solution by contact with a cake of soap or the like, we propose in Figure 10 to use a bleeder jet emerging from jet hole 240 in member 212 to provide a suitably predetermined flow of fluid to the contents of boss 242 for eventual drainage from boss 242 to bore 226. In this manner, soap scraps or nibs (as shown in Figure 10) can be placed in solution to salvage the same by using the resulting soapy discharge from tube 244 to wash dishes or for laundering purposes, the spigot being advantageously applied to sinks or laundry tubes as well as to bath tubs. Should it be desired to draw only pure aerated water from spigot 212, an ordinary cork or the like in duct 227 would preclude any contamination thereof by possible drainage from boss 242. Equally simple means can be used to seal jet hole 240 should that be desired.

In all forms of the invention the spigot is mounted against wall 300 of tub 302 which is carried by floor 304 and rests adjacent walls 303. In tub 302 is established liquid plane 99 either by the discharge from tube 44 or prior to operation of the device. As has previously been stated, the discharge from tubes 44 or 144 or 244 forms a steep cone whose outline is shown in Figure 1 as at 308. Liquid plane 99 being substantially at right angles thereto, an approximately circular beating zone 310 is established on that plane for the purposes previously specified.

From the foregoing and this additional disclosure, it can be seen that a practical reduction of what previously was stated to be the crux of the invention is provided and that three different embodiments, each of which is especially advantageous for certain applications have been disclosed. It is to be understood that each of the disclosed embodiments can be applied to bath tubs as shown in Figure 1 and that the particular choice thereof depends primarily upon the type of tub installation available.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus adapted to direct a mixture of dilute foamaceous liquid and entrained gas against the surface of a body of liquid exposed to a gas to form a light bodied foam, comprising an elongated tube adapted to be positioned vertically with its lower end open, a receptacle attached to the top of the tube and forming an integral portable unit with said tube, a drain from said receptacle communicating with said tube at its upper and central portion and directed substantially axially of said tube, means substantially surrounding said drain and forming a series of jets for discharging a liquid downwardly through said tube, said jets being directed so as to converge along the axis of said tube, means for supplying a liquid under pressure for discharge through said jets, and a series of openings in the walls of said tube below said jets for admission of air to the upper portion of said tube but below said jets.

2. A portable apparatus for producing foam baths, comprising a receptacle for foam forming material; a draft tube below said receptacle and having an open bottom end; means forming a passage connecting the bottom of said receptacle to the top of said tube; means forming a liquid supply chamber adjacent the top of said tube; means adapted to connect said chamber to a pressure water supply, said chamber having a series of discharge passages operable to deliver the water in downwardly converging and impinging jets to the upper portion of the draft tube, and means providing air inlet openings in said upper portion of the draft tube.

WALLACE KUBACKI.
RADCLIFFE MORRIS URQUHART.

REFERENCES CITED

The following references are of record in the file of this patent:

UNITED STATES PATENTS

| Number | Name | Date |
|---|---|---|
| 1,930,500 | Archibald | Oct. 17, 1933 |
| 1,837,136 | Roberts | Dec. 15, 1931 |
| 1,887,836 | Eaber | Nov. 15, 1932 |
| 2,028,214 | Hennessy | Jan. 21, 1936 |
| 1,346,286 | Waterhouse | July 13, 1920 |
| 1,328,456 | Ross | Jan. 20, 1920 |
| 2,128,311 | Mertes | Aug. 30, 1938 |
| 1,380,665 | Lyster | June 7, 1921 |
| 2,231,782 | Thompson | Feb. 11, 1941 |
| 1,681,308 | Parker | Aug. 21, 1928 |
| 1,757,140 | Pulkinghorn | May 6, 1930 |
| 2,003,184 | Friedrich | May 28, 1935 |
| 2,089,646 | Friedrich | Aug. 10, 1937 |

FOREIGN PATENTS

| Number | Country | Date |
|---|---|---|
| 505,083 | Great Britain | May 5, 1939 |
| 434,931 | Great Britain | Sept. 11, 1935 |
| 305,030 | Great Britain | Jan. 30, 1930 |
| 435,979 | Great Britain | Oct. 2, 1935 |